(12) United States Patent
Marzorati et al.

(10) Patent No.: US 12,741,423 B2
(45) Date of Patent: Sep. 22, 2026

(54) PARALLELIZED ADDITIVE MANUFACTURING

(71) Applicant: INTERNATIONAL BUSINESS MACHINES CORPORATION, Armonk, NY (US)

(72) Inventors: Mauro Marzorati, Lutz, FL (US); Faith Opiyo, Nieuw Vennep (NL); Vinod A. Valecha, Pune (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 18/311,272

(22) Filed: May 3, 2023

(65) Prior Publication Data

US 2024/0367383 A1 Nov. 7, 2024

(51) Int. Cl.

*B29C 64/182* (2017.01)
*B29C 64/393* (2017.01)

(Continued)

(52) U.S. Cl.

CPC .......... *B29C 64/393* (2017.08); *B29C 64/182* (2017.08); *B33Y 10/00* (2014.12); *B33Y 50/02* (2014.12)

(58) Field of Classification Search

CPC ... B29C 64/182; B29C 64/386; B29C 64/393; B33Y 50/00; B33Y 50/02; B33Y 10/00

See application file for complete search history.

(56) References Cited

U.S. PATENT DOCUMENTS 10,040,250 B2 8/2018 Liu et al.
10,603,717 B2 3/2020 Grant et al.

(Continued)

FOREIGN PATENT DOCUMENTS

CN 105196549 B 7/2017
CN 108798027 B 11/2018

(Continued)

OTHER PUBLICATIONS

Konig et al, "Method for Segmentation and Hybrid Joining of Additive Manufactured Segments in Prototyping Using the Example of Trim Parts," Dec. 29, 2021, Available https://doi.org/10.3390/designs6010002 (Year: 2021).*

Autodesk Ember 3D Printing, "Massively Parallel and Modular 3D Printing // Additive Manufacturing," YouTube, Accessed: Jan. 18, 2023, https://www.youtube.com/watch?app=desktop&v=c4jd8IfBA6w, 4 pages.

(Continued)

*Primary Examiner* — Alvin H Tan
(74) *Attorney, Agent, or Firm* — Tihon Poltavets

(57) ABSTRACT

A method for parallel additive manufacturing includes receiving a three-dimensional digital model file of an object for construction utilizing multiple additive manufacturing devices. The method also includes determining a decomposition of the three-dimensional digital model file of the object into multiple portions and instructing each additive manufacturing device from the multiple additive manufacturing devices to generate at least one portion from the multiple portions of the object. The multiple additive manufacturing devices operate in parallel to generate the multiple portions of the object. The method also include constructing the object with the multiple portions generated by the multiple additive manufacturing devices.

17 Claims, 4 Drawing Sheets

(51) Int. Cl.
*B33Y 10/00* (2015.01)
*B33Y 50/02* (2015.01)

(56) References Cited

U.S. PATENT DOCUMENTS 10,620,611 B2 * 4/2020 Meess ..................... B22F 10/66
10,751,952 B2 8/2020 Lee et al.
11,718,036 B2 * 8/2023 Taig ..................... B29C 64/386 700/118
12,208,579 B2 * 1/2025 Zhou ..................... H01M 10/46
2015/0201499 A1 * 7/2015 Shinar .................. H05K 1/0284 425/132
2015/0293722 A1 10/2015 Cudak et al.
2016/0016362 A1 * 1/2016 Kim ..................... B23Q 15/00 700/98
2017/0297267 A1 10/2017 Liu
2022/0343035 A1 * 10/2022 Swierkot ................. G06F 30/27

FOREIGN PATENT DOCUMENTS

CN 109594777 B 11/2020
CN 112942838 A 6/2021
WO 2019149001 A1 8/2019

OTHER PUBLICATIONS

Disclosed Anonymously, "Method and System for Rapid 3D Printing with Ferromagnetic Material Powder," IP.com, IP.com No. IPCOM000266964D, IP.com Publication Date: Sep. 8, 2021, 6 pages.
Disclosed Anonymously, "Volume Aware Geomodels 3D Printing," IP.com, IP.com No. IPCOM000238584D, IP.com Publication Date: Sep. 4, 2014, 19 pages.
Wikipedia, "Line printer," Wikipedia—The Free Encyclopedia, Accessed: Jan. 18, 2023, https://en.wikipedia.org/wiki/Line_printer, 8 pages.
Perumalla et al., "Additive Manufacturing With Cast Selection", U.S. Appl. No. 18/056,742, filed Nov. 18, 2022, 32 pages.

* cited by examiner

PARALLELIZED ADDITIVE MANUFACTURING

BACKGROUND

This disclosure relates generally to additive manufacturing, and in particular to parallelized additive manufacturing to construct an object utilizing multiple portions.

In data communications, data is typically transmitted to peripheral devices (e.g., printers) serially or in parallel. A serial port is able to transmit a single stream of data at a time, where the serial port sends data bit by bit after sending a bit at a time. A parallel port is able to transmit multiple data streams at a time, where the parallel port sends data by sending multiple bits in a parallel manner.

An impact printer is a type of printer requiring direct contact of an ink ribbon with a paper. Impact printers, such as a dot matrix printer, use a printer head that prints a character then moves on until an entire line is printed, at which point the paper is advanced. Line printers operate in a faster manner, as each impact prints one entire line of text at a time before advancing to another line. By printing a complete line at a time, line printers are much faster than character printers. A typical additive manufacturing device, often referred to as a three-dimensional printer, is similar in operation to a dot matrix printer.

Additive manufacturing utilizes a three-dimensional digital model file to construct an object by tracing a print head sequentially through every three-dimensional pixel of a shape to be generated. Sequentially represents a single three-dimensional pixel being disposed at a time in a series manner to generate the shape of the object. Therefore, an amount of time required to construct the object is directly and linearly related to the number of three-dimensional pixels the shape contains, either full or empty, since the printer head of the additive manufacturing device needs to traverse the space to generate the shape. Traversing the space to generate the shape is a source of added time during the additive manufacturing process. Limitations associated with usage velocity and flow rate for a single additive manufacturing device is another source of added time during the additive manufacturing process of an object.

SUMMARY

Embodiments in accordance with the present invention disclose a method, computer program product and computer system for parallelized additive manufacturing, the method, computer program product and computer system can receive a three-dimensional digital model file of an object for construction utilizing a plurality of additive manufacturing devices. The method, computer program product and computer system can determine a decomposition of the three-dimensional digital model file into a plurality of portions of the object. The method, computer program product and computer system can instruct each additive manufacturing device from the plurality of additive manufacturing devices to generate at least one portion from the plurality of portions of the object, wherein the plurality of additive manufacturing devices operate in parallel to generate the plurality of portions of the object. The method, computer program product and computer system can construct the object with the plurality of portions of the object generated by the plurality of additive manufacturing devices. An advantage includes generating multiple portions of the object in parallel utilizing multiple additive manufacturing devices to accelerate a construction of an object.

Other embodiments in accordance with the present invention disclose a method, computer program product and computer system for parallelized additive manufacturing, the method, computer program product and computer system can receive at least one additional requirement for the decomposition of the three-dimensional digital model file of the object into a plurality of portions. The method, computer program product and computer system can analyze the three-dimensional digital model file to identify a general shape for the object and a plurality of individual components of the general shape for the object. An advantage includes utilizing the additional requirements to determine a decomposition of the object based on a provide time constraint in the form of a time value, while maintaining object integrity and meeting any user specified aesthetic requirements for the multiple portions of the object.

Other embodiments in accordance with the present invention disclose a method, computer program product and computer system for parallelized additive manufacturing, the method, computer program product and computer system can instruct one or more assembly devices to perform a plurality of movements and actions to construct the objects with the plurality of portions, wherein each movement from the plurality of movements is selected from the group consisting of: positioning, placing, disposing, fusing, bonding, connecting, and interlocking a first portion from the plurality of portions with a second portion from the plurality of portions. An advantage includes constructing an object utilize interlocking portions which provide greater structural integrity for the object being generated with the multiple additive manufacturing devices.

Other embodiments in accordance with the present invention disclose a method, computer program product and computer system for parallelized additive manufacturing, the method, computer program product and computer system can verify construction of the object with the plurality of portions generated by the plurality of additive manufacturing devices with respect to the three-dimensional digital model file of the object. An advantage includes ensuring construction of the object with the multiple portions generated by the multiple additive manufacturing device match the received three-dimensional digital model file for the object.

DETAILED DESCRIPTION

Figure 1:
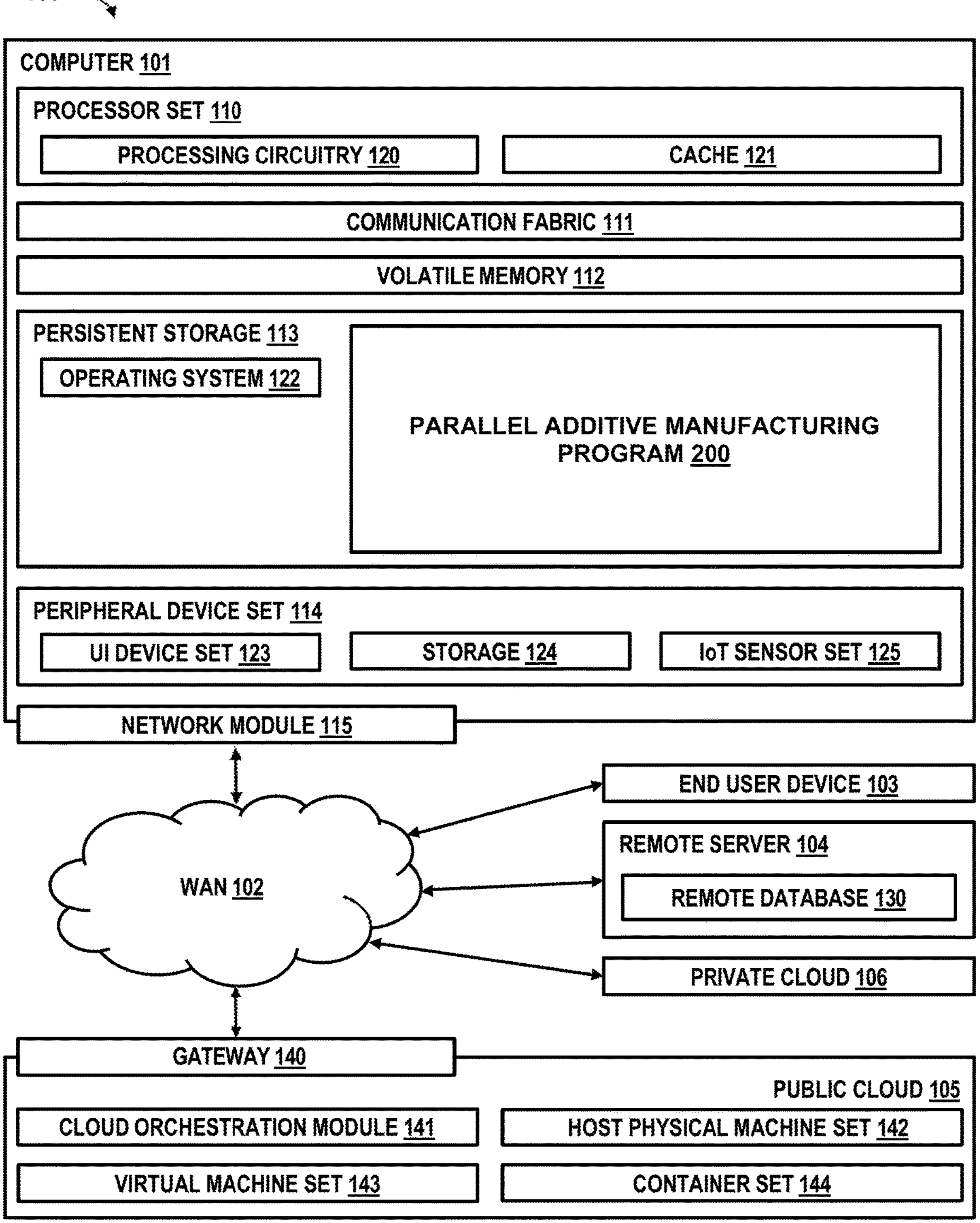
FIG. 1 is a functional block diagram illustrating a computing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide accelerated printing of arbitrary three-dimensional shapes by the stacking of primitive shapes and subsequently joining the three-dimensional shapes via fusing through chemical and/or thermal bonding. Traditional serial printing of primitive shapes is typical performed by layers via many printing heads in parallel, thus achieving high-speed generation. The operation includes three distinct macro processes that are executed in sequence to produce the piece at an accelerated rate. For a decomposition process, the shape to be printed is decomposed in layers. These can include horizontal, vertical, and/or diagonal seams or joins. The layers may not be of uniform depth (or width if vertical) but conformity aids in accelerated printing. For a to-be-printed layering process, the layered primitive shapes are printed by a number of three-dimensional printers in parallel. The primitive shapes need not be printed in the same orientation as the final assembly (e.g., upside-down, laid on-side, etc.). The primitive shapes may feature temporary supports made from a secondary material, where the temporary supports are removable prior to constructions of the multiple layers/portions to form a final object. For a digital to physical reassembling process, the newly printed primitive shapes are assembled and fused in place through the application of chemical bonding agents between the layers, thermal plates, and/or pressure plates. In some embodiments quick-hardening material is sprayed-on much like lacquer or clearcoat to provide additional rigidity.

Embodiments of the present invention can analyze, via a shape decomposer, the shape to be printed to determine optimal and appropriate smaller shapes/bricks and decomposed into the identified shapes/bricks by the shape decomposer. Determining the optimal and appropriate smaller shapes/brick can include identifying the shape to decompose, analyzing the shape to identify the component parts, determining how those component parts can be divided or separated, applying the chosen division or separation method to the shape to create the desired outcome, and utilize a knowledge corpus for shape configurations and decomposition strategies. Considerable context (i.e., additional requirements) for said data storage of the artifacts can include shape volume, usage velocity, filament variety, veracity measurements, and longevity values. Utilizing the parallel printers, printing of each individual shapes starts, where each shape is printed and subsequently moved to an assembly apparatus. Embodiment of the present invention can utilize the assembly apparatus to perform a comparison with the initial decomposition to ensure that all required pieces are printed and with specification to an original three-dimensional model file. A fault checker can initialize a fault check and identify faulty pieces for reprinting. Once all the brick pieces are in place, the fusing element is provided. This can be done through the application of chemical bonding agents between the layers, powder, thermal plates, and/or pressure plates. Once the complex detail is assembled, embodiments of the present invention perform another fault and resilience check to validate the printed item and subsequently, the fully printed item is then delivered to a user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as parallel additive manufacturing program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
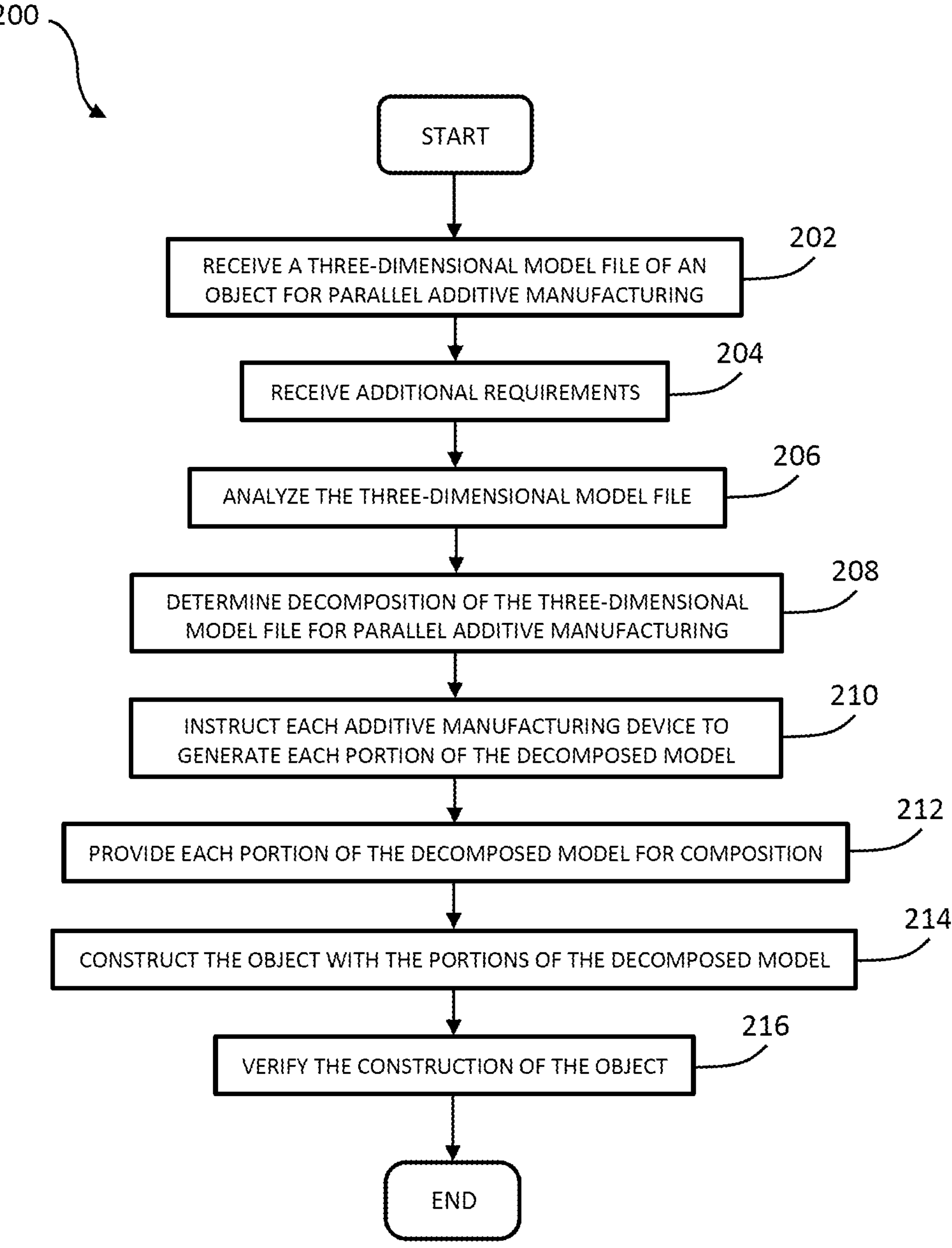
FIG. 2 depicts a flowchart of a parallel additive manufacturing program for parallel additive manufacturing and construction of a final object with portions of decomposed portions of the final object, in accordance with an embodiment of the present invention.

FIG. 2 depicts a flowchart of a parallel additive manufacturing program for parallel additive manufacturing and construction of a final object with portions of decomposed portions of the final object, in accordance with an embodiment of the present invention.

Parallel additive manufacturing program 200 receives a three-dimensional model file of an object for parallel additive manufacturing (202). Parallel additive manufacturing includes analyzing and decomposing the three-dimensional model file for the object to generate portions of the object with multiple additive manufacturing devices and subsequently constructing the object with the generated portions.

The three-dimensional model file is a mathematical coordinate-based representation for an internal and/or external surface of an object in three-dimensions defined along the x-axis, y-axis, and z-axis. The three-dimensional digital model can be created utilizing a computer-aided design (CAD) package, a three-dimension scanner of an existing object, and/or multiple digital images utilizing photogrammetry to extract three-dimensional measurements from two-dimensional data (i.e., the multiple digital images). In one embodiment, parallel additive manufacturing program 200 can receive a three-dimensional digital model file for parallel additive manufacturing in the form of a stereolithography file format (STL) file or additive manufacturing file format (AMF) file, for a CAD model of an object. In another embodiment, parallel additive manufacturing program 200 can receive a three-dimensional model file for parallel additive manufacturing in the form of a three-dimensional scan of an existing objecting utilizing a hand-held laser scanner, a structure-light three-dimensional scanner, or a modulated light three-dimensional scanner. In yet another embodiment, parallel additive manufacturing program 200 can receive a three-dimensional model file for parallel additive manufacturing in the form of a three-dimensional model file generated by photogrammetry software for a scanned object, where the photogrammetric software can provide a necessary CAD model for the scanned object in the form of an STL file or AMF file.

Parallel additive manufacturing program 200 receives additional requirements (204). In this embodiment, parallel additive manufacturing program 200 receives (e.g., from a user) additional requirements for the object being constructed with the three-dimensional model file as it relates to the decomposition and construction of the object during the parallel additive manufacturing process. Parallel additive manufacturing program 200 also utilizes a knowledge corpus with various shape configuration and decompositions based on the additional requirements for various three-dimensional model files. The knowledge corpus is updatable with each iteration of the parallel additive manufacturing process, such that, parallel additive manufacturing program 200 continuously improves on the analyzing of the three-dimensional model file and the determining of the decomposition of the three-dimensional model file. Additional requirements can include a shape volume for each portion of the object, a number of portions of the object, usage velocity, filament variety, veracity measurements, longevity value, a time value, and any other user or additive manufacturing device specified requirements. An additional requirement specifying a shape volume for each portion of the object can include a minimum and/or maximum shape volume for each portion of the object representing a volume of the material generated by an additive manufacturing device for a single portion of the object, where parallel additive manufacturing program 200 utilizes each portion to construct the object. Parallel additive manufacturing program 200 can receive the shape volume for each portion of the object as a numerical value (e.g., 1000 $cm^3$) or as a percentage value of the object as a whole (e.g., $x<25\%$ of total object volume).

An additional requirement representing a number of portions of the object can include the user specifying a maximum and/or a minimum number of portions of the object for decomposition and construction or a user specified total number of portions of the object for decomposition and construction. In one example, parallel additive manufacturing program 200 receives an additional requirement where the user specifies a maximum number of portions for decomposition and construction as ten, where parallel additive manufacturing program 200 can decomposition and construct the object utilizing a maximum of ten portions. Parallel additive manufacturing program 200 analyzes the three-dimensional model file and determines the decomposition of the three-dimensional model, while ensuring the maximum number of portions of the decomposed three-dimensional model does not exceed ten portions.

An additional requirement specifying usage velocity can include a speed at which a printer head or extruder is moving at any given time for an additive manufacturing device. Parallel additive manufacturing program 200 can utilizes manufacturer specified usage velocity to determine a duration of time for generating each portion of the object based on a shape volume (i.e., how much material is to be generated). An additional requirement specifying filament variety can include one or more materials required to construct each portion of the object. Since parallel additive manufacturing program 200 utilizes multiple additive manufacturing devices, a first additive manufacturing device can utilize a first filament to produce portions of the object requiring the first filament, a second additive manufacturing device can utilize a second filament to produce portions of the object requiring the second filament, and a third additive manufacturing device can utilize a combination of the first filament and the second filament to produce portions of the object where the two filaments are intertwined and/or place within one another. An additional requirement specifying veracity measurements can include dimensional accuracy values which is an assessment of how close to given dimensions provided in the three-dimensional model are to a target value found on a portion of the object or the object as a while. Each additive manufacturing device can include varying veracity measurements and parallel additive manufacturing program 200 can utilizes the veracity measurements to ensure the construction of the object with the portions of the decomposed model are as accurate as possible.

An additional requirement can include a longevity value representing an expected life for each additive manufacturing device and/or the object being constructed with the three-dimensional value. An additional requirement can include a time value for decomposing and constructing the object. For example, parallel additive manufacturing program 200 receives an additional requirement where the user specifics a time value of six hours for decomposing and constructing the object. Parallel additive manufacturing program 200 subsequently analyzes the three-dimensional model file, determines the decomposition of the three-dimensional model, generates each portion of the decomposed three-dimensional model, and constructs the object with the decomposed portions within the time value provided. Parallel additive manufacturing program 200 can utilize the time value, along with the shape volume and usage velocity to ensure an optimal decomposition of the three-dimension model for subsequent generation of the multiple portions to construct the object. In other embodiment, an additional requirement can include user specified aesthetic requirements, such as, incorporating seams between two portions of the object into a design feature (e.g., a crease, a cavity) to ensure the seams are inconspicuous.

Parallel additive manufacturing program 200 analyzes the three-dimensional model file (206). Parallel additive manufacturing program 200 analyzes the three-dimension model file by identifying a general shape of the object for decomposition and identifying individual component parts of the general shape of the object. Identifying the general shape and the individual component parts for the object allows for parallel additive manufacturing program 200 to determine which of the available additive manufacturing devices can assist with the parallel additive manufacturing of the object. By identifying the general shape of the object, parallel additive manufacturing program 200 can further identify areas where a seam or a join is placeable during the construction of the object. A seam or a join represents a structural connection between two portions of the object that parallel additive manufacturing program 200 is constructing with the parallel additive manufacturing process. The seams and joins can be external or internal with respect to the three-dimensional model file, where any additional requirements previously provided by the user in (204) to parallel additive manufacturing program 200 can limit where each seam or join is placed. In one example, parallel additive manufacturing program 200 identifies thirty areas in the general shape of the object where seams and joins can be placed to construct the object subsequent to the multiple additive manufacturing devices generating each portion. However, parallel additive manufacturing program 200 determines, based on usage velocity received as additional requirements in (204) and an amount of available additive manufacturing devices, the object requires at least five of the thirty possible seams and joins to construct the object from six portions. A minimum number of seams or joins to construct the object with the multiple portions generated during the parallel additive manufacturing process is one less than the number of portions that parallel additive manufacturing program 200 utilizes to construct the object.

By identifying individual components for the general shape of the object, parallel additive manufacturing program 200 identifies which of the available additive manufacturing device can generate each of the identified individual components. In one example, parallel additive manufacturing program 200 identifies a particular component of the general shape requires a specific type of filament for construction, wherein the specific type of filament is utilized by a particular additive manufacturing device from the multiple additive manufacturing devices. In another example, parallel additive manufacturing program 200 identifies a particular component of the general shape is of a volume that requires a specific additive manufacturing device from the multiple additive manufacturing devices to construct the particular component. In some embodiment, parallel additive manufacturing program 200 identifies the individual components for the general shape of the object, highlights each individual component, and displays each highlight for each individual component as an overlay in the three-dimensional model file. Parallel additive manufacturing program 200 can receive a confirmation of the various components from the user or can receive an alteration to a highlighted individual component of the general shape for the object. For example, parallel additive manufacturing program 200 identifies six individual components for a general shape of an object that is a sitting stool, highlights each of the six individual components of the sitting stool and displays each highlight for each individual component as an overlay in the three-dimensional model file. Parallel additive manufacturing program 200 can receive an alteration from a user specifying that the general shape of the sitting stool has five components (i.e., four support legs and one sitting platform) and not six components as identified by parallel additive manufacturing program 200. Parallel additive manufacturing program 200 can subsequently store the alteration in a knowledge corpus for future identification of individual component for similar general shapes of objects.

Parallel additive manufacturing program 200 determines decomposition of the three-dimensional model file for parallel additive manufacturing (208). In this embodiment decomposition of the three-dimensional model file for parallel additive manufacturing is based on the received additional requirements in (204), the analysis of the three-dimensional model in (206), and availability of the multiple additive manufacturing devices. When determining decomposition of the three-dimensional model file for additive manufacturing, parallel additive manufacturing program 200 can determine a number of portions to decompose the three-dimensional model file, a location for each of the seams or joins for the three-dimensional model file, an assignment of each portion of the decomposed three-dimensional model file to an additive manufacturing device, and an order for generating each portion of the decomposed three-dimensional model file. In one example, parallel additive manufacturing program 200 determines decomposition of the three-dimensional model file of an object for parallel additive manufacturing based on a time value received from the user, where a generation of the portions and construction of the object with the portions is to be completed within the specified time frame (i.e., the time value). Based on the usage velocity for each additive manufacturing device and the time value received, parallel additive manufacturing program 200 decomposes the three-dimensional model file for the object into four portions for parallel additive manufacturing and subsequent construction of the object with the four portions. In another example, parallel additive manufacturing program 200 determines decomposition of the three-dimensional model file of an object for parallel additive manufacturing based on seam and join placements for the object. Based on user specified aesthetic requirements, parallel additive manufacturing program 200 determines decomposition of the three-dimensional model into a number of portions to accelerate the constructions of the object, while integrating each seam or join into a design feature of the object.

Parallel additive manufacturing program 200 instructs each additive manufacturing device to generate each portion of the decomposed model (210). In this embodiment, parallel additive manufacturing program 200 creates an additional three-dimensional model file for each portion of the decomposed model and stores each of the additional three-dimensional model files in the knowledge corpus for future iterations of the parallel additive manufacturing process (e.g., large quantity repetitive production). Parallel additive manufacturing program 200 instructs each additive manufacturing device to generate each portion of the decomposed model by sending the new three-dimensional model file of each portion of the decomposed model to a respective additive manufacturing device from the multiple additive manufacturing devices. The parallel additive manufacturing process of the multiple portions of the decomposed model by the multiple additive manufacturing devices accelerates a construction of the object from the three-dimensional model. The parallel additive manufacturing process is further beneficial in a repeatable high volume manufacturing setting where a large quantity of the object is to be constructed. For example, parallel additive manufacturing program 200 analyzing the three-dimensional model file for the object, determining the decomposition of the three-dimensional model, and creating of the additional three-dimensional model file for each portion of the decomposed model is performed once, since the additional three-dimensional model files for the portions of the objects are stored and recalled from the knowledge corpus for repeatable iterations of constructing the object.

Parallel additive manufacturing program 200 provide each portion of the decomposed model for construction (212). In this embodiment, parallel additive manufacturing program 200 receives confirmation from each additive manufacturing device subsequent to generation of each respective portion of the decomposed model and instructs an industrial device (e.g., robotic arm, robotic platform) to relocate each portion of the decomposed model to an area for constructing the object. The area represents a platform where parallel additive manufacturing program 200 constructs the object utilizes the various portions generated by the multiple additive manufacturing devices. In one example, the area is a platform accessible by one or more industrial device, where parallel additive manufacturing program 200 utilizes the platform to construct the object with the various portions generated by the multiple additive manufacturing devices. Parallel additive manufacturing program 200 instructs one or more industrial devices to relocate the portion generated by each additive manufacturing device to the platform for construction of the object. In another example, the area is a platform of one of the additive manufacturing devices from the multiple additive manufacturing devices, where parallel additive manufacturing program 200 utilizes a portion of the object generated on the platform of the additive manufacturing device as a base portion for constructing the object with the remaining portions from the other additive manufacturing devices. Parallel additive manufacturing program 200 instructs one or more industrial devices to relocate the remaining portions generated by the other additive manufacturing devices to the additive manufacturing device with the base portion for construction of the object.

Parallel additive manufacturing program 200 constructs the object with the portions of the decomposed model (214). Subsequent to parallel additive manufacturing program 200 placing each portion in an appropriate location with respect to the three-dimensional model file, parallel additive manufacturing program 200 provides a fusing element to couple the various portions together to form the object. Parallel additive manufacturing program 200 can utilize an application of chemical bonding agents between layers, powder, thermal, and/or pressure plates to couple the various portions of together to dorm the object. From a previous example where parallel additive manufacturing program 200 instructs the one or more industrial devices to relocate the portion generated by each additive manufacturing device to the platform for construction of the object, parallel additive manufacturing program 200 constructs the object with the portions of the decomposed model. Parallel additive manufacturing program 200 instructs one or more assembly devices to construct the object with the portions generated by the multiple additive manufacturing devices, where parallel additive manufacturing program 200 instructs the one or more assembly devices to perform various movements and actions to assemble the object with portions of the decomposed model. The various movements and action can include positioning, placing, disposing, fusing, bonding, connecting, and interlocking each of the portions with respect to one another to construct the object as presented in the three-dimensional model file previously received in (202).

From another previous example parallel additive manufacturing program 200 instructs one or more industrial devices to relocate the remaining portions generated by the other additive manufacturing devices to the additive manufacturing device with the base portion for construction of the object. Parallel additive manufacturing program 200 instructs the additive manufacturing device and one or more assembly devices to perform various movements and actions to assemble the object with portions of the decomposed model utilizing the base portion as a starting point for construction of the object as presented in the three-dimensional model file previously received in (202).

Parallel additive manufacturing program 200 verifies the construction of the object (216). Parallel additive manufacturing program 200 verifies the construction of the object by performing fault inspections and resilience checks to ensure the object is properly constructed. In one example, parallel additive manufacturing program 200 performs fault inspection utilizing various cameras (e.g., photo, infrared) and image processing software on each portion of the object, along with each seam and join between the portions of the object, to identify any faults in the object (e.g., fractures, chips). In another example, parallel additive manufacturing program 200 performs resilience checks by applying a force to various areas of the object (e.g., vehicle suspension component) to ensure the object can withstand the forces applied to the object in a typical operational environment. In the event parallel additive manufacturing program 200 verifies the construction of the object, parallel additive manufacturing program 200 moves the object along a supply chain process. In the event parallel additive manufacturing program 200 could not verify the construction of the object, parallel additive manufacturing program 200 isolates the object from a supply chain process and sends a notification to the user regarding a failure to verify the construction of the object.

Figure 3:
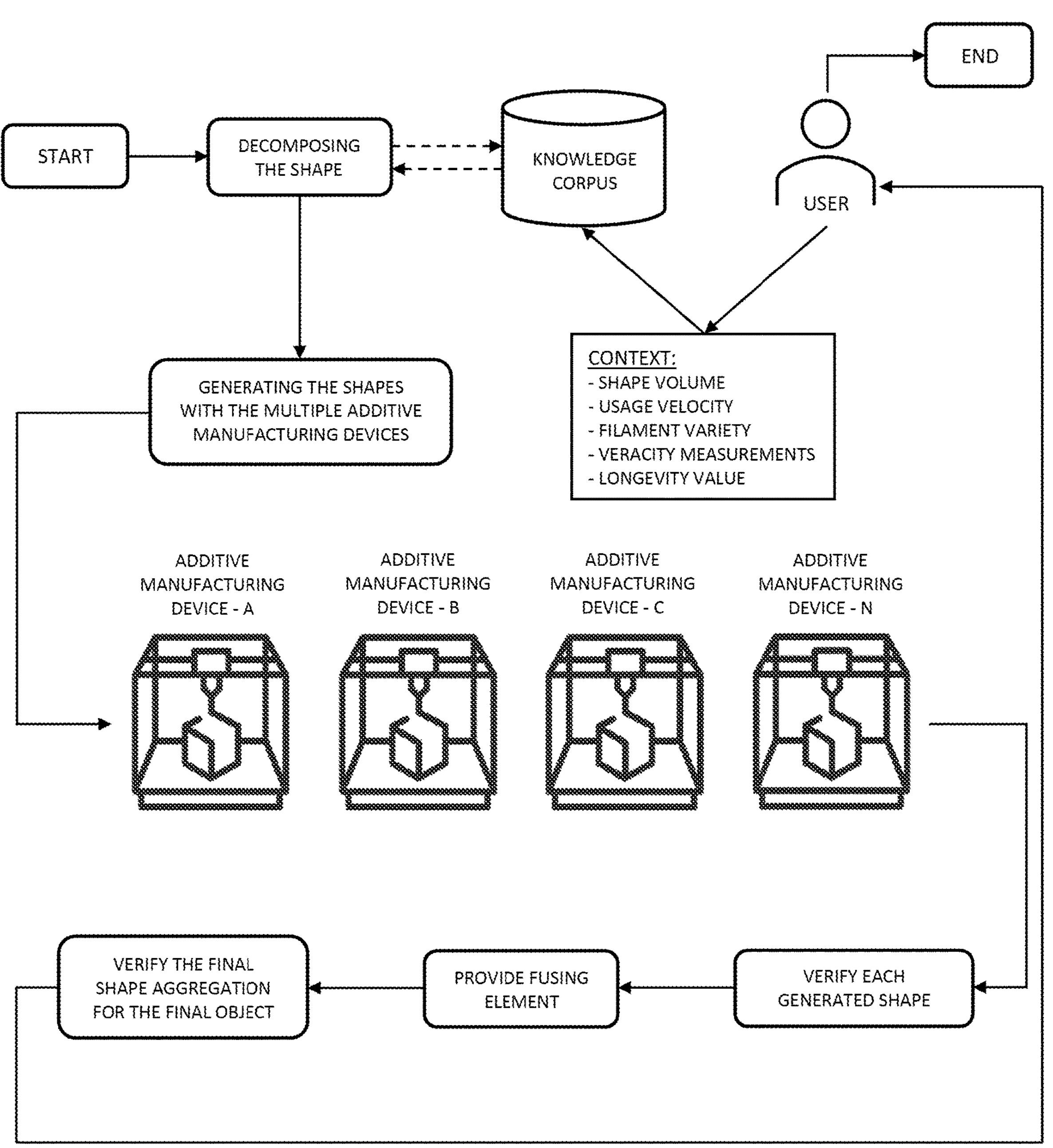
FIG. 3 depicts a process flow for parallel additive manufacturing and construction of a final object with portions of decomposed portions of the final object, in accordance with an embodiment of the present invention.

FIG. 3 depicts a process flow for parallel additive manufacturing and construction of a final object with portions of decomposed portions of the final object, in accordance with an embodiment of the present invention. The process flow for parallel additive manufacturing includes parallel additive manufacturing program 200 performing the step previously discussed with regards to FIG. 2, along with the various tasks performable by additive manufacturing devices A, B, C, and N, industrial devices, and assembly devices. In this process flow, parallel additive manufacturing program 200 receives a three-dimensional digital model file of an object for parallel additive manufacturing from the user, along with additional requirements for the object that provide context when analyzing the three-dimensional digital model file. As previously discussed, the additional requirements can include items such as shape volume, usage velocity, filament variety, veracity measurements, and longevity values. Parallel additive manufacturing program 200 stores the additional requirements that provide context in the knowledge corpus for future iterations of the parallel additive manufacturing process for constructing an object. Parallel additive manufacturing program 200 determines decomposition of the three-dimensional digital model file for parallel additive manufacturing by decomposing the shape into individual components (i.e., portions) based on the context provided via the additional requirements. Parallel additive manufacturing program 200 instructs additive manufacturing devices A, B, C, and N to generate each portion of the decomposed model, where additive manufacturing device N represents the $N^{th}$ (e.g., $8^{th}$) additive manufacturing device in the parallel additive manufacturing process. Each of additive manufacturing devices A, B, C, and N generate the shapes for each portion of the object and parallel additive manufacturing program 200 verifies each generated shape prior to construction of the object. In response to verifying each shape generated by additive manufacturing devices A, B, C, and N meet or exceed respective specification measures according to the three-dimensional digital model file, parallel additive manufacturing program 200 provides each portion of the decomposed model for composition, along with a fusing element to construct the object from the generated portions. Parallel additive manufacturing program 200 constructs the object with the generated portions and verifies the final shape aggregation for the final object with respect to the three-dimensional digital model file to ensure proper construction with the multiple portions.

Figure 4:
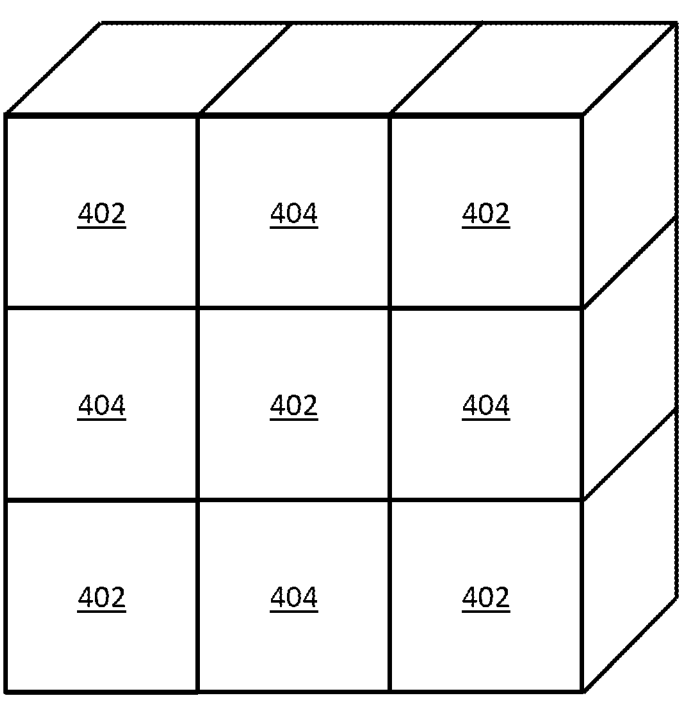
FIG. 4 depicts an illustrative example of an object being constructed utilizing strips of generated shapes during a parallel additive manufacturing process, in accordance with an embodiment of the present invention.

FIG. 4 depicts an illustrative example of an object being constructed utilizing strips of generated shapes during a parallel additive manufacturing process, in accordance with an embodiment of the present invention. In this example, parallel additive manufacturing program 200 decomposes the object into multiple strips representing the multiple portions of the object, where a single additive manufacturing device generates a single strip from the multiple strips. FIG. 4 illustrates a basic arrangement of strips to form an object, where strips 402 represent portions of the object that a first additive manufacturing device generates utilizing a first type of filament and strips 404 represent portions of the object that a second additive manufacturing device generates utilizing a second type of filament. Rather generate the object pixel by pixel with a single additive manufacturing device, in this example parallel additive manufacturing program 200 instructs the first additive manufacturing device and the second additive manufacturing device to generate respective strip 402 and 404. Upon completion of every strips 402 and 404, parallel additive manufacturing program 200 constructs the object with strips 402 and 404 utilizing a fusing element between each strip to form the object.

Figure 5:
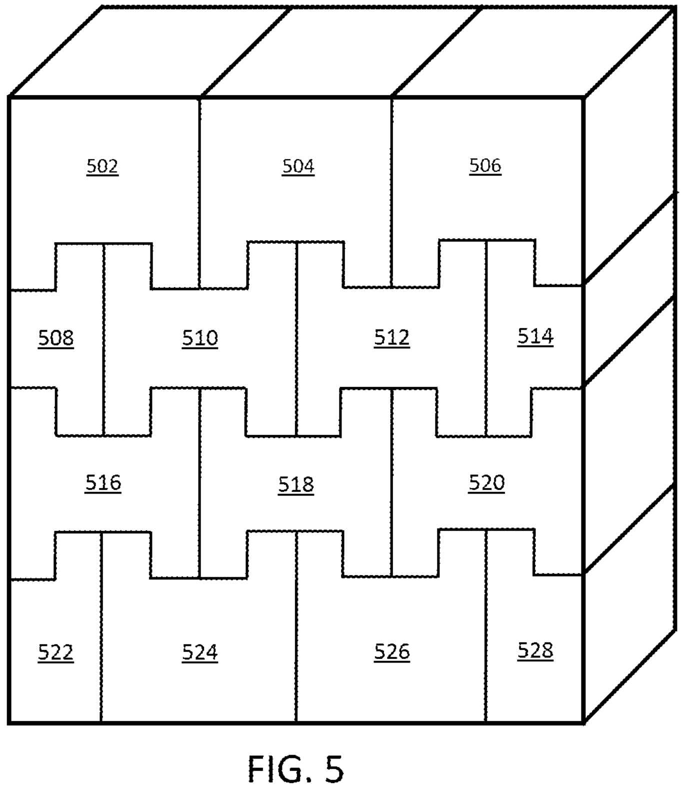
FIG. 5 depicts an illustrative example of an object being constructed utilizing interlocking generated shapes to facilitate interlocking during a parallel additive manufacturing process, in accordance with an embodiment of the present invention.

FIG. 5 depicts an illustrative example of an object being constructed utilizing interlocking generated shapes to facilitate interlocking during a parallel additive manufacturing process, in accordance with an embodiment of the present invention. In this example, parallel additive manufacturing program 200 decomposes the object into multiple interlocking blocks representing the multiple portions of the object, where a single additive manufacturing device generates a single interlocking from the multiple interlocking blocks. The interlocking blocks include various protruding members and indentations to facilitate engagement between the multiple interlocking blocks to construct the object. Parallel additive manufacturing program 200 can utilize a fusing element or bonding agent to further secure the multiple interlocking blocks. Based on the additional requirements specifying usage velocity of each additive manufacturing device from the available additive manufacturing device, shape volume, and a time value, parallel additive manufacturing program 200 analyzes a three-dimensional model file for the object. Parallel additive manufacturing program 200 determines a decomposition of the object into four rows, the first row includes interlocking block 502, 504, and 506, the second row include interlocking block 508, 510, 512, and 514, the third row includes interlocking block 516, 518 and 520, and the fourth row include interlocking block 522, 524, 526, and 528.

Parallel additive manufacturing program 200 generates a first new three-dimensional model file for interlocking block 502, 504, 506, 524, and 526 and instructs a first additive manufacturing device to generate interlocking block 502, 504, 506, 524, and 526 based on the first new three-dimensional model. Parallel additive manufacturing program 200 generates a second new three-dimensional model file for interlocking block 508 and 514 and a third new three-dimensional model file for interlocking block 522 and 528 and instructs a second additive manufacturing device to generate interlocking block 508, 514, 522, and 528 based on the second new three-dimensional model and the third new three-dimensional model. Parallel additive manufacturing program 200 generates a fourth new three-dimensional model file for interlocking block 510, 512, 516, 518, and 520 and instructs a third additive manufacturing device to generate interlocking block 510, 512, 516, 518, and 520 based on the fourth new three-dimensional model. As previously discussed, parallel additive manufacturing program 200 utilizes the three-dimensional model file for the object to generate the new three-dimension models files (i.e., first, second, third, and fourth) for the four different types of interlocking blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving a three-dimensional digital model file of an object for construction utilizing a plurality of additive manufacturing devices;

analyzing the three-dimensional digital model file to identify a general shape of the object and a plurality of components of the object, the plurality of components based on an alteration by a user stored in a knowledge corpus, wherein the alteration by the user specifies a number of components for a previous shape of a previous object that is similar to the general shape of the object;

determining a decomposition of the three-dimensional digital model file into the plurality of components, wherein the decomposition includes multiple interlocking blocks that represent the plurality of components of the object;

instructing each additive manufacturing device from the plurality of additive manufacturing devices to generate at least one component from the plurality of components of the object, wherein the plurality of additive manufacturing devices operate in parallel to generate the plurality of components of the object; and constructing the object with the plurality of components of the object generated by the plurality of additive manufacturing devices, wherein each interlocking block from the multiple interlocking blocks includes protruding members and indentations to facilitate engagement between the multiple interlocking blocks to construct the object.

2. The method of claim 1, further comprising:

receiving at least one additional requirement for the decomposition of the three-dimensional digital model file into the plurality of components of the object.

3. The method of claim 2, wherein the determining the decomposition of the three-dimensional digital model file into the plurality of components of the object is further based on the at least one additional requirement.

4. The method of claim 2, wherein the at least one additional requirement is selected from the group consisting of: a shape volume for each component of the object, a number of portions of the object, usage velocity, filament variety, veracity measurements, longevity value, a time value, and a user specified requirement.

5. The method of claim 1, wherein the constructing the object with the plurality of components of the object further comprises:

instructing one or more assembly devices to perform a plurality of movements and actions to construct the object with the plurality of components of the object, wherein each movement from the plurality of movements is selected from the group consisting of: positioning, placing, disposing, fusing, bonding, connecting, and interlocking a first component from the plurality of components of the object with a second component from the plurality of components of the object.

6. The method of claim 1, further comprising:

verifying the construction of the object with the plurality of components of the object generated by the plurality of additive manufacturing devices with respect to the three-dimensional digital model file of the object.

7. A computer program product comprising:

one or more computer readable storage media; and program instructions stored on the one or more computer readable storage media to perform operations comprising:

receiving a three-dimensional digital model file of an object for construction utilizing a plurality of additive manufacturing devices;

analyzing the three-dimensional digital model file to identify a general shape of the object and a plurality of components of the object, the plurality of components based on an alteration by a user stored in a knowledge corpus, wherein the alteration by the user specifies a number of components for a previous shape of a previous object that is similar to the general shape of the object;

determining a decomposition of the three-dimensional digital model file into the plurality of components, wherein the decomposition includes multiple interlocking blocks that represent the plurality of components of the object;

instructing each additive manufacturing device from the plurality of additive manufacturing devices to generate at least one component from the plurality of components of the object, wherein the plurality of additive manufacturing devices operate in parallel to generate the plurality of components of the object; and constructing the object with the plurality of components of the object generated by the plurality of additive manufacturing devices, wherein each interlocking block from the multiple interlocking blocks includes protruding members and indentations to facilitate engagement between the multiple interlocking blocks to construct the object.

8. The computer program product of claim 7, wherein the operations further comprise:

receiving at least one additional requirement for the decomposition of the three-dimensional digital model file into the plurality of components of the object.

9. The computer program product of claim 8, wherein the determining the decomposition of the three-dimensional digital model file into the plurality of components of the object is further based on the at least one additional requirement.

10. The computer program product of claim 8, wherein the at least one additional requirement is selected from the group consisting of: a shape volume for each component of the object, a number of portions of the object, usage velocity, filament variety, veracity measurements, longevity value, a time value, and a user specified requirement.

11. The computer program product of claim 7, wherein the constructing the object with the plurality of components of the object, comprises:

instructing one or more assembly devices to perform a plurality of movements and actions to construct the object with the plurality of components of the object, wherein each movement from the plurality of movements is selected from the group consisting of: positioning, placing, disposing, fusing, bonding, connecting, and interlocking a first component from the plurality of components of the object with a second component from the plurality of components of the object.

12. The computer program product of claim 7, wherein the operations further comprise:

verifying the construction of the object with the plurality of components of the object generated by the plurality of additive manufacturing devices with respect to the three-dimensional digital model file of the object.

13. A computer system comprising:

a processor set:

one or more computer readable storage media; and program instructions stored on the one or more computer readable storage media to cause the processor set to perform operations comprising:

receiving a three-dimensional digital model file of an object for construction utilizing a plurality of additive manufacturing devices;

analyzing the three-dimensional digital model file to identify a general shape of the object and a plurality of components of the object, the plurality of components based on an alteration by a user stored in a knowledge corpus, wherein the alteration by the user specifies a number of components for a previous shape of a previous object that is similar to the general shape of the object;

determining a decomposition of the three-dimensional digital model file into the plurality of components, wherein the decomposition includes multiple interlocking blocks that represent the plurality of components of the object;

instructing each additive manufacturing device from the plurality of additive manufacturing devices to generate at least one component from the plurality of components of the object, wherein the plurality of additive manufacturing devices operate in parallel to generate the plurality of components of the object; and constructing the object with the plurality of components of the object generated by the plurality of additive manufacturing devices, wherein each interlocking block from the multiple interlocking blocks includes protruding members and indentations to facilitate engagement between the multiple interlocking blocks to construct the object.

14. The computer system of claim 13, wherein the operations further comprise:

receiving at least one additional requirement for the decomposition of the three-dimensional digital model file into the plurality of components of the object.

15. The computer system of claim 14, wherein the determining the decomposition of the three-dimensional digital model file into the plurality of components of the object is further based on the at least one additional requirement.

16. The computer system of claim 14, wherein the at least one additional requirement is selected from the group consisting of: a shape volume for each component of the object, a number of portions of the object, usage velocity, filament variety, veracity measurements, longevity value, a time value, and a user specified requirement.

17. The computer system of claim 13, the constructing the object with the plurality of components of the object comprises:

instructing one or more assembly devices to perform a plurality of movements and actions to construct the object with the plurality of components of the object, wherein each movement from the plurality of movements is selected from the group consisting of: positioning, placing, disposing, fusing, bonding, connecting, and interlocking a first component from the plurality of components of the object with a second component from the plurality of components of the object.

* * * * *